United States Patent [19]

Fey et al.

[11] 4,010,090
[45] Mar. 1, 1977

[54] PROCESS FOR CONVERTING NATURALLY OCCURRING HYDROCARBON FUELS INTO GASEOUS PRODUCTS BY AN ARC HEATER

[75] Inventors: Maurice G. Fey, Plum Borough, Pa.; George A. Kemeny, Sudbury, Mass.; Frederick A. Azinger, Jr., Churchill Borough, Pa.

[73] Assignee: Westinghouse Electric Corporation, Pittsburgh, Pa.

[22] Filed: Aug. 11, 1975

[21] Appl. No.: 603,576

[52] U.S. Cl. .................... 204/170; 23/277 R; 204/171; 204/172; 250/542
[51] Int. Cl.² .................. B01K 1/00; C07C 3/00; C07C 5/00; C07C 11/22
[58] Field of Search .............. 204/168, 170–172; 250/542, 547; 23/277 R

[56] References Cited

UNITED STATES PATENTS

| | | | |
|---|---|---|---|
| 3,079,325 | 2/1963 | Butenuth et al. | 204/168 X |
| 3,375,316 | 3/1968 | Harris | 13/9 R |
| 3,541,379 | 11/1970 | Holden | 250/542 X |
| 3,554,715 | 1/1971 | Bruning et al. | 48/197 |
| 3,791,949 | 2/1974 | Hioayama et al. | 204/171 |

*Primary Examiner*—F.C. Edmundson
*Attorney, Agent, or Firm*—L. P. Johns

[57] ABSTRACT

A process for converting naturally occurring hydrocarbon fuels into gaseous products characterized by the steps of introducing a hydrocarbon gas into the arc chamber of an arc heater having an operating temperature therein sufficiently high to produce free hydrocarbon radical ions from the hydrocarbon gas, and feeding into the arc chamber naturally occurring coal or oil to produce a stream of gaseous hydrocarbon fuel.

9 Claims, 2 Drawing Figures

PROCESS FOR CONVERTING NATURALLY OCCURRING HYDROCARBON FUELS INTO GASEOUS PRODUCTS BY AN ARC HEATER

BACKGROUND OF THE INVENTION

1. Field of the Invention

This invention relates to electric arc heaters and more particularly it pertains to a process for and a conversion of naturally occurring fuels into gaseous products.

2. Description of the Prior Art

The application of plasma technology to high temperature processes in the organic, inorganic, and extractive metallurgy areas has been widely researched. Previous investigations have included the plasma production of the acetylene and other hydrocarbons, nitrogen fixation, the production of oxides, carbides, and nitrides, and reduction of metal oxides and halides, benefication of complex minerals, and plasma remelting and refining. An example of a method and arc heater is shown in U.S. Pat. No. 3,765,870, entitled "Method of Direct Ore Reduction Using a Short Cap Arc Heater", by Maurice G. Fey and George A. Kemeny, issued Oct. 16, 1973. Other examples of similar processes are disclosed in that patent.

Despite extensive research, there are relatively few large scale commercial processes based on plasma technology. In general, those commercial processes have been confined to processes requiring temperatures not attainable by a conventional technique, to applications in which reduced capital requirements were of importance, or to processes where the plasma method resulted in a product with unique characteristics. In most cases, the plasma route has not been economically competitive because of higher energy costs. However, the situation is changing due to the shrinking supplies of light hydrocarbon fuels and to the development of a stable electric energy economy.

In view of the limited sources of natural gas as a fuel and the greater sources of oil and particularly coal, the desirability of converting oil and coal to a gaseous form of fuel is manifest. The electric arc heater is a potentially useful device for that purpose, because the high temperature technology involved is readily effective to produce free hydrocarbon radical ions from hydrocarbon fuel in a potentially economical manner when compared with other alternative procedures.

SUMMARY OF THE INVENTION

In accordance with this invention it has been found that naturally occurring hydrocarbons may be converted to gaseous products, comprising the steps of striking an electric arc in an axial gap between generally hollow, cylindrical electrodes spaced along a common axis that form an arc chamber therein having two ends, said arc being maintained at a temperature for at least a portion of its life sufficient to produce free hydrocarbon radical ions from hydrocarbon fuel; introducing a hydrocarbon gas selected from the group consisting of methane, ethane, propane, butane, acetylene, natural gas, and mixtures thereof, with or without hydrogen, through said gap to thereby elongate the arc to produce a temperature sufficiently high to produce the free hydrocarbon radical ions from the hydrocarbon gas; feeding into one end of the arc chamber a naturally hydrocarbon fuel, such as coal, oil, and substances in which coal or oil is a constituent, through the arc chamber and into the region of the free hydrocarbon radical ions to thereby chemically react with the free radical ions to produce a stream of gaseous hydrocarbon fuel; and withdrawing the stream of gaseous hydrocarbon fuel from an exhaust port at the other end of the arc chamber.

The advantage of the process of this invention is that it enables the chemical processing of fluids or particulate solids in a short gap self-stabilizing arc heater in an expedient manner.

Associated with the foregoing are prior known apparatus and methods such as disclosed in U.S. Pat. Nos. 3,149,222, 3,182,176, 3,375,316, 3,765,870, 3,389,189, and Re 25,858, which disclose the use of so-called plasma jet apparatus or arc heaters for specific purposes that patentably distinguish from the process of this invention.

DESCRIPTION OF THE PREFERRED EMBODIMENTS

The process of this invention for the converting of naturally occurring hydrocarbon fuels in a solid or liquid state into gaseous hydrocarbon products comprises the steps of striking an electric arc in an axial gap between generally hollow, cylindrical electrodes spaced along a common axis that form an arc chamber therein having two ends, the arc being maintained at a temperature for at least a portion of its life sufficient to produce free hydrocarbon radical ions from hydrocarbon fuel; introducing a hydrocarbon gas selected from the group consisting of ethane, methane, propane, butane, and mixtures thereof, with or without hydrogen, through the gap in a direction generally transverse to the axis to thereby elongate the arc to produce a temperature therein sufficiently high to produce the free hydrocarbon radical ions from the hydrocarbon gas; feeding into one end of the arc chamber a fuel selected from the group consisting of naturally occurring coal and naturally occurring oil, or substances containing coal, or oil, through the arc heater and into the region of the free hydrocarbon radical ions to thereby chemically react with the free radical ions to produce a stream of gaseous hydrocarbon fuel; and withdrawing the stream of gaseous hydrocarbon fuel from an exhaust port at the other end of the arc chamber.

Figure 1:
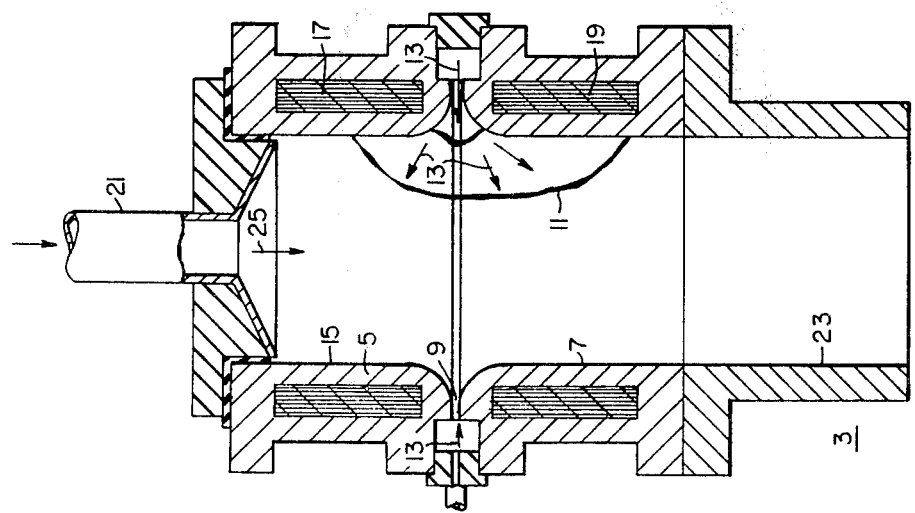
FIG. 1 is a vertical sectional view of an arc heater apparatus for performing the process of this invention.

The apparatus by which the process of this invention is preferably performed includes an arc heater 3, as shown in FIG. 1, and is similar in construction and operation to that disclosed in U.S. Pat. No. 3,765,870, entitled "Method Of Direct Ore Reduction Using A Short Gap Arc Heater" of which the inventors are Maurice G. Fey and George A. Kemeny. Because of the full disclosure in that patent the description of the arc heater 3 is limited herein to the basic structure and operation. The arc heater 3 is a single-phase, self-stabilizing AC device capable of power levels up to about 3,500 kilowatts or up to 10,000 kilowatts for a three-phase plant installation. For the practice of this invention it is preferred that three arc heaters be provided, one for each of the three phases of the AC power supply. A three arc heater system is shown in the embodiment of the invention of FIG. 2.

As shown in FIG. 1 the arc heater 3 has two annular copper electrodes 5, 7 which are spaced at 9 about one millimeter apart to accommodate a line frequency power source of about 4 kV. An arc 11 occurs in the space or gap 9 and incoming feed stock gas 13 immediately blows the arc 11 from the space into the interior of the arc chamber 15. The arc 11 rotates at a speed of about 1,000 revolutions per second by interaction of the arc current (several thousand amps AC) with a DC magnetic field set up by internally mounted field coils 17, 19. The velocities yield a vary high operating efficiency for equipment of this type.

In addition to the feed stock gas 13, secondary feed stock can be introduced at an inlet port 21 axially into the chamber 15. Exit enthalpies ranging, for example, up to about 15,000 BTU per pound when operated on methane are easily obtained at good thermal efficiencies at an exit or outlet port 23 of the arc heater chamber 15. Feed stock 25 is introduced into the arc heater through the inlet port 21 and comprises a naturally occurring fuel selected from the group consisting of coal and oil. Hereafter, the terms "coal" and/or "oil" are intended to include those materials occurring free or as constituents in other substances, such as shale. Where coal is used it is pulverized to facilitate handling and the reaction within the chamber 15. The feed stock 25 is a hydrocarbon material selected from the group consisting of coal, oil, and a mixture thereof. Where coal is used it is preferably pulverized to facilitate handling and enable reaction with other gases to occur more expeditiously within the arc chamber. Coal and-/or oil comprise feed stock 25, introduced through the inlet port 21, either separately or in combination with a reaction gas such as hydrogen, which hydrogen is preferably mixed with the coal or fuel oil ahead of the inlet port 21. Coal and/or oil used separately with or without hydrogen are then mixed with the feed stock gas 13 which comprises hydrocarbon gases such as methane or heavier hydrocarbon charge stock, such as ethane, propane, butane, synthesis gas and the like, which commingle with the coal or oil to react within the revolving arc 11 at temperatures of up to 6,000° F to provide acetylene ($C_2H_2$) in accordance with the following formula (1):

$$2C_xH_y + H_2 \rightarrow aC + C_2H_2 + bH_2 \qquad (1)$$

The foregoing reaction provides an improvement in increased acetylene mole fraction in the heater outlet port 23.

Figure 2:
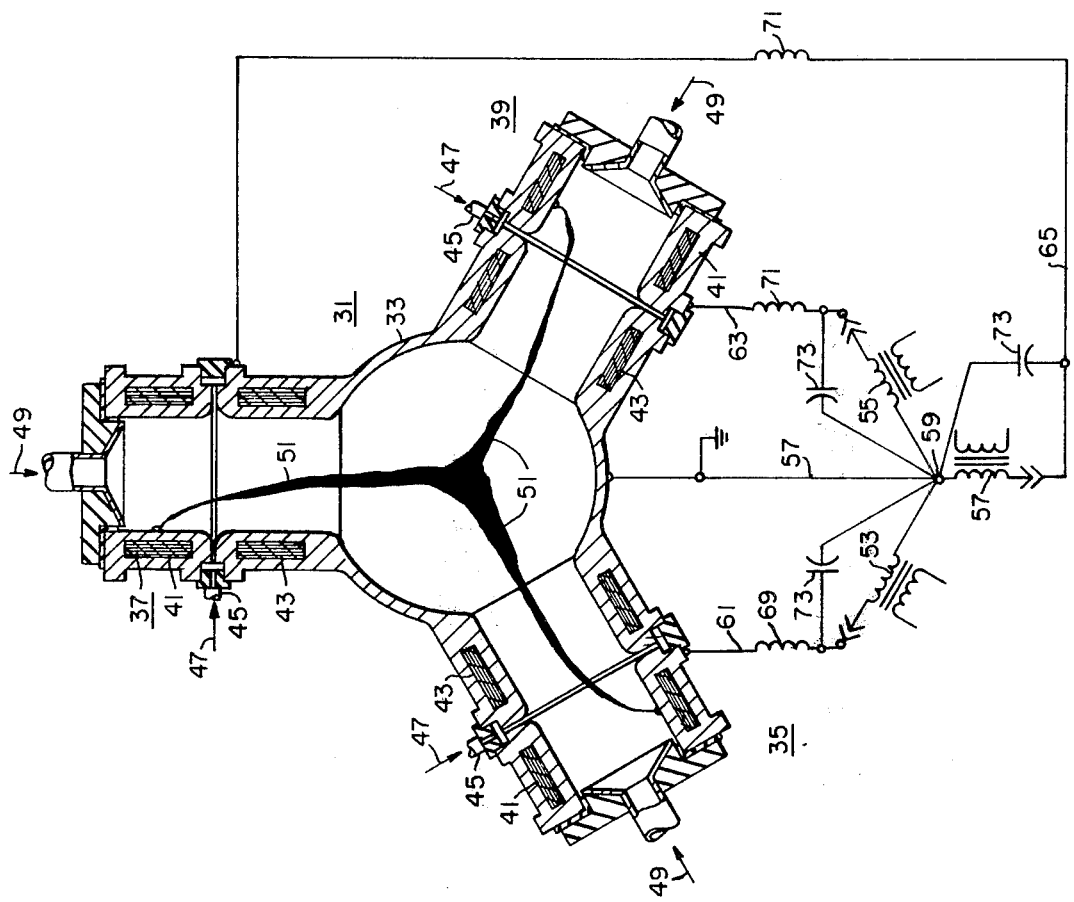
FIG. 2 is a horizontal sectional view of another embodiment of this invention showing a three-phase type of arc heater with power source.

Another embodiment of the apparatus by which the process of this invention may be practiced is shown in FIG. 2 in which a polyphase arc heater system is generally indicated at 31 and it comprises a housing 33 and a plurality (such as three) of arc heaters 35, 37, 39 which are disposed radially of the housing 33. Each arc heater 35, 37, 39 is similar in construction and operation to the arc heater 3 except that the outlet port 23 is preferably omitted so that each arc heater is attached to and communicates with the interior of the housing 33. For the practice of this invention it is preferred that three arc heaters be provided, one for each of the three phases of the AC power supply. Each arc heater 35, 37, 39 comprises two annular copper electrodes 41, 43 otherwise known as upstream and downstream electrodes. A space or gap 45 exists between each pair of upstream and downstream electrodes 41, 43 which gap is about one millimeter to accommodate the line frequency power source of about 4 kV. A spark occurs in the gap and incoming feed stock gas 47 immediately blows the spark from the gap into the interior of the arc chamber of each arc heater in a manner similar to the arc 11 in FIG. 1. As the arc rotates at a speed of about 1000 revolutions per second by interaction of the arc current and a DC magnetic field set up in the internally mounted field coils, a very high operating efficiency results in this type of equipment. As the gas 47 enters the arc heater it mixes with feed stock 49 of coal or oil, with or without added hydrogen, and moves downstream toward the housing 33. It is noted, however, that in both embodiments hydrogen is added at the gap 9 or 47 and may also be added with the feed stock 49.

Due to the gas pressures exerted the several arcs 51 created in each arc heater 35, 37, 39 extend into the plenum chamber of the housing 33 and merge with each other, whereupon the downstream extremity of each arc eventually skips the downstream electrodes 43 to complete the circuit through the several arc heaters through one of the other arcs 51. The unique three-phase arc heater system is provided in which three wye-connected self-stabilizing arc heaters fire into a common plenum where the arcs impinge on one another to form a three phase arc 51 that extends between the three upstream electrodes 41.

The electric circuit by which the three-fold arcing phenomenon functions includes a wye-connected power system (FIG. 2) having three sources 53, 55, 57 which have one end connected together at a junction 59 and have the other ends connected by phase conductors 61, 63, 65, respectively, to the upstream electrodes 41 of each arc heater. A ground neutral conductor 57 extends from the junction 59 to the housing which in turn is connected to the upstream electrodes 43 of each arc heater. In a conventional manner each source 53, 55, 57 is a secondary winding of an output transformer having primary windings from an AC source.

Accordingly, for one phase of the AC cycle the current flows through the coil 53, the conductor 61, a current limiting reactor 69, the upstream electrode 41, the arc 51, through the upstream electrode 41 of the adjacent arc heater 37, through the conductor 65, the current limiting reactor 71, and the coil 57. The next phase of the cycle includes a combination of another pair of the arc heaters so that the arc 51 flashes intermittently between two of the three upstream electrodes 41 and passes through the arc chamber 33 substantially as shown in FIG. 2. Similar capacitors 73 serve the purpose of power factor correction.

In operation, as the fuel, such as coal particles or oil droplets, enter the plenum chamber formed by the housing 33 from the upper end in a manner similar to that shown in FIG. 1, they fall through the confluence of the arcs 51 where in the proper atmosphere of the hydrocarbon gas, the fuel is converted chemically through acetylene and moves downwardly to the lower end of the housing where it is collected and removed through an appropriate outlet.

In addition to the conversion of naturally occurring fuels, such as coal and oil, the device of this invention may be used for converting coal into producer gas by reacting it with steam in accordance with the following reaction:

$$C_xH_y + xH_2O \rightarrow xCO + (x + Y/2)H_2 \quad (2)$$

Most of the steam is introduced through the gap 9 (FIG. 1) or gaps 47 FIG. 2) together, or the steam may be used to convey the pulverized coal through the inlet 21 in an amount necessary to conduct the coal into the reaction chamber.

The construction and operation of the three phase arc heater system of FIG. 2 is likewise disclosed in Ser. No. 603,579, filed Aug. 11, 1975.

In conclusion, the advantages of the process for converting naturally occurring hydrocarbon fuels into gaseous products is that such products are made more plentiful simply be feeding coal or oil as stock into an arc heater in a simple and expeditious manner.

What is claimed is:

1. In a process for converting naturally occurring hydrocarbon fuels into a gaseous product comprising the steps of:
    providing a poly-phase arc heater system characterized by a number of arc heaters having arc chambers communicating with a central housing chamber;
    striking an electric arc in an axial gap between generally hollow, cylindrical electrodes spaced along a common axis that form the arc chamber in each of the intercommunicating arc heater chambers, the arc being maintained at a temperature for at least a portion of its life sufficient to produce free hydrocarbon radical ions from hydrocarbon fuel;
    introducing a hydrocarbon gas selected from the group consisting of ethane, methane, propane, butane, and mixtures thereof, through the gap in a direction generally transverse to the axis to thereby elongate the arc to produce a temperature therein sufficiently high to produce the free hydrocarbon radical ions from the hydrocarbon gas and to cause the arc in each arc heater to flash through the central housing chamber and into another arc heater;
    feeding into one end of the central housing chamber naturally occurring coal or oil through the arc chamber and into the region of the free hydrocarbon radical ions to thereby chemically react with the free radical ions to produce a stream of gaseous hydrocarbon fuel; and
    withdrawing the stream of gaseous hydrocarbon fuel from an exhaust port at the other end of the arc chamber.

2. The process of claim 1 wherein a portion of the hydrocarbon gas is introduced with the coal or oil.

3. The process of claim 1 wherein the hydrocarbon gas is one selected from the group consisting of ethane, methane, propane, and butane.

4. The process of claim 1 wherein the hydrocarbon gas comprises hydrogen and methane.

5. The process of claim 4 wherein the gaseous hydrocarbon fuel product contains acetylene.

6. The process of claim 1 wherein steam is injected into the arc chamber with the methane.

7. The process of claim 1 wherein there are three arc heaters.

8. The process of claim 7 wherein the arc heater system operates at up to 10,000 kilowatts.

9. The process of claim 1 wherein the arc has a temperature of up to 6,000° F.

* * * * *